United States Patent
Rothman et al.

(10) Patent No.: US 7,681,027 B2
(45) Date of Patent: Mar. 16, 2010

(54) METHODS AND APPARATUS FOR PROVIDING SELF-DESCRIBING MEDIA

(75) Inventors: Michael A. Rothman, Gig Harbor, WA (US); Vincent J. Zimmer, Federal Way, WA (US)

(73) Assignee: Intel Corporation, Santa Clara, CA (US)

( * ) Notice: Subject to any disclaimer, the term of this patent is extended or adjusted under 35 U.S.C. 154(b) by 1605 days.

(21) Appl. No.: 10/317,579

(22) Filed: Dec. 12, 2002

(65) Prior Publication Data
US 2004/0117608 A1    Jun. 17, 2004

(51) Int. Cl.
*G06F 9/24* (2006.01)
(52) U.S. Cl. .................. 713/2; 713/1; 713/100
(58) Field of Classification Search ........ 713/1, 713/2, 100
See application file for complete search history.

(56) References Cited

U.S. PATENT DOCUMENTS

| | | | | |
|---|---|---|---|---|
| 5,835,760 | A * | 11/1998 | Harmer | 713/2 |
| 5,836,013 | A * | 11/1998 | Greene et al. | 713/2 |
| 6,421,776 | B1 * | 7/2002 | Hillis et al. | 713/2 |
| 6,434,695 | B1 * | 8/2002 | Esfahani et al. | 713/2 |
| 6,505,298 | B1 * | 1/2003 | Cerbini et al. | 713/1 |
| 2003/0110369 | A1 * | 6/2003 | Fish et al. | 713/1 |

OTHER PUBLICATIONS

Intel Corporation, Extensible Firmware Interface Specification, Dec. 12, 2000, Intel Corporation, Version 1.02, pp. 325-326.*
Doran, Mark, Extensible Firmware Interface—Changing the face of BIOS, Aug. 28, 2001, Intel Corporation, p. 21.*
Stevens, Curtis and Stan Merkin, "El Torito" Bootable CD-ROM Format Specification, Jan. 25, 1995, Phoenix Technologies, Version 1.0 p. 16.*
El Torito—Bootable CD-ROM Specification Version 1.0. http://www.phoenix.com/resources/specs-cdrom.pdf, Jan. 25, 2002, 20 pages.
Mt. Rainier standard. http://www.mt-rainier.org, printed Jun. 10, 2003, 1 page.
Extensible Firmware Interface. http://developer.intel.com/technology/efi, printed Jun. 10, 2003, 2 pages.
AT Attachment Standard. http://www.t13.org, printed Jun. 10, 2003, 17 pages.

* cited by examiner

*Primary Examiner*—Tse Chen
(74) *Attorney, Agent, or Firm*—Hanley, Flight & Zimmerman, LLC

(57) ABSTRACT

Methods and apparatus for providing self-describing media are disclosed. In one example, the processor readable media includes a first portion storing information arranged according to a format and further includes a second portion storing a firmware extension thereon. In such an arrangement, the firmware extension is adapted to be read by a processor in a pre-boot environment and to inform the processor of the format of information stored in the first portion.

36 Claims, 4 Drawing Sheets

METHODS AND APPARATUS FOR PROVIDING SELF-DESCRIBING MEDIA

TECHNICAL FIELD

The present disclosure pertains to processing systems and media useful in processing systems and, more particularly, to methods and apparatus for providing self-describing media.

BACKGROUND

When a processor such as, for example, a processor in a conventional personal computer, is powered up, the processor executes a reset vector, which points the processor to firmware code stored in a boot block of a memory (e.g., a portion of a flash memory). The instructions in the boot block impart functionality to the processor and inform the processor of the location of further firmware instructions in memory to be executed by the processor.

As support for the processor evolves, the firmware stored in the memory may be updated to provide the processor enhanced functionality or to instruct the processor to interface with new devices. Firmware updates typically consist of overwriting the existing firmware in the memory with a new set of firmware instructions. Additionally, in the case of corrupt firmware in memory, the corrupt firmware may be restored to its prior, uncorrupt state. When the firmware is updated or sorted, however, the boot block (e.g., the portion of memory providing the system, which includes the processor, with its most base system initialization) is not updated. The boot block is not altered because it is so fundamental to system operation that corruption of the boot block could render the system useless until a new component having an uncorrupted boot block is placed in communication with the processor.

Historically, firmware updates or restores were carried out by reading firmware instructions from a conventional diskette (e.g., a three and one-half inch, 1.44 megabyte (MB) diskette) and writing the information from the diskette to the memory containing the firmware. This was possible even in situations in which the firmware was corrupt because the boot block included instructions informing the processor of how to interface with a drive in which the diskette was placed. However, as the number and complexity of firmware instructions has increased, the storage requirements of media on which the firmware instructions may be stored have grown. For example, while, historically, firmware instructions could be carried on a single 1.44 MB diskette, the size of the firmware instructions now eclipse the 1.44 MB, thereby requiring several diskettes onto which replacement firmware is written. However, because the firmware is the very instruction set that gives the processor the ability to manage input and output from media, it is difficult or impossible to read from multiple diskettes during a firmware restore or upgrade.

In addition to including instructions for the processor to access a drive in which a diskette is placed, the boot block also includes instructions that enable a processor to access a particular location of an optical disk when such a media is inserted into an optical drive prior to processor power-up. The accessibility of optical media by the processor via the boot block, coupled with the ever-increasing information capacity of optical media, has made optical disks the media of choice for restoring or updating firmware.

While the desirability of restoring or updating firmware from optical media can be readily appreciated, there is presently a proliferation of formats or standards in which information may be written to optical media, some such formats or standards are proprietary. Many of these information formats are not readable by a processor in a pre-boot state due to limited firmware size and due to the fact that many new standards or formats may emerge during a firmware lifecycle. For example, in a pre-boot environment, today most firmware instructs processors only to handle information formatted in an information standards organization (ISO) 9660 format. Images of any one of various different optical media formats may be placed on ISO 9660 formatted media. However, the processor in a pre-boot environment will be unable to read the information in these images. Accordingly, a processor is unable to boot from optical media formatted in any format other than ISO 9660 or any other format supported by the firmware.

DETAILED DESCRIPTION

Although the following disclosed example systems include, among other components, firmware or software executed on hardware, it should be noted that such systems are merely illustrative and should not be considered as limiting. For example, it is contemplated that any or all of these hardware, firmware and software components could be embodied exclusively in dedicated hardware, exclusively in software, exclusively in firmware or in some suitable combination of hardware, firmware and/or software. Accordingly, while the following describes example systems, persons of ordinary skill in the art will readily appreciate that the examples are not the only way to implement such systems.

Figure 1:
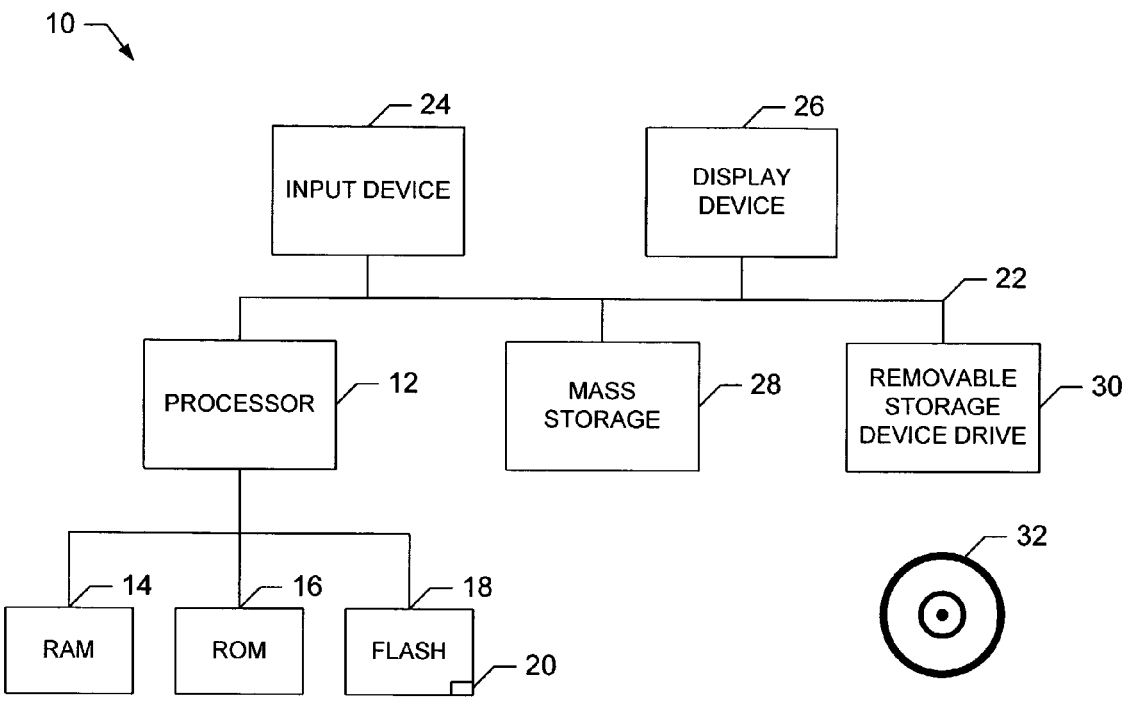
FIG. 1 is a diagram of an example processor system.

Turning now to FIG. 1, an example processor system 10 includes a processor 12 having associated memories, such as a random access memory (RAM) 14, a read only memory (ROM) 16 and a flash memory 18. The flash memory 18 of the illustrated example includes a boot block 20. The processor 12 is coupled to an interface, such as a bus 22 to which other components may be interfaced. In the illustrated example, the components interfaced to the bus 22 include an input device 24, a display device 26, a mass storage device 28 and a removable storage device drive 30. The removable storage device drive 30 may include associated removable storage media 32. Such as magnetic or optical media.

The example processor system 10 may be, for example, a conventional desktop personal computer, a notebook computer, a workstation or any other known computing device. The processor 12 may be any type of well known processing unit, such as a microprocessor from the Intel® Pentium® family of microprocessors, the Intel® Itanium® family of microprocessors, and/or the Intel XScale® family of processors. The memories 14, 16 and 18 that are coupled to the processor 12 may be any suitable memory devices and may be sized to fit the storage demands of the system 10. In particular, the flash memory 18 may be a non-volatile memory that is accessed and erased on a block-by-block basis.

The input device 24 may implemented by a keyboard, a mouse, a touch screen, a track pad or any other known device that enables a user to provide information to the processor 12. The display device 26 may be, for example, known video display devices, such as a liquid crystal display (LCD) monitor, a cathode ray tube (CRT) monitor or any other suitable device that acts as an interface between the processor 12 and a user. The display device 26 as pictured in FIG. 1 includes any additional hardware required to interface a physical display screen to the processor 12. The mass storage device 28 may be, for example, a conventional hard drive or any other magnetic or optical media that is readable by the processor 12.

The removable storage device drive 30 may, for example, be an optical drive, such as a compact disk-recordable (CD-R) drive, a compact disk-rewritable (CD-RW) drive, a digital versatile disk (DVD) drive or any other optical drive. It may alternatively be, for example, a magnetic media drive. The removable storage media 32 is complimentary to the removable storage device drive 30, inasmuch as the media 32 is selected to operate with the drive 30. For example, if the removable storage device drive 30 is an optical drive, the removable storage media 32 may be a CD-R disk, a CD-RW disk, a DVD disk or any other suitable optical disk. On the other hand, if the removable storage device drive 30 is a magnetic media device, the removable storage media 32 may be, for example, a diskette or any other suitable magnetic storage media.

As described in detail hereinafter, the disclosed system enables the processor 12 to read information from the removable storage media 32 placed in the removable storage device drive 30 in a pre-boot environment. This functionality is imparted to the processor 12 through a firmware extension that is stored on the removable storage media 32 at, for example, the time the removable storage media 32 is formatted. For convenience, the example processor system 10 of FIG. 1 will be used to describe the format, write, read and boot processes described herein. It will be understood, however, that one or more of these processes may be carried out by different processor systems. For example, a software manufacturer may format an optical disk to include the firmware extension using a first processor to execute the format process and a consumer who purchases the software may use a second processor to execute the read process on his/her system to install the software.

Figure 2:
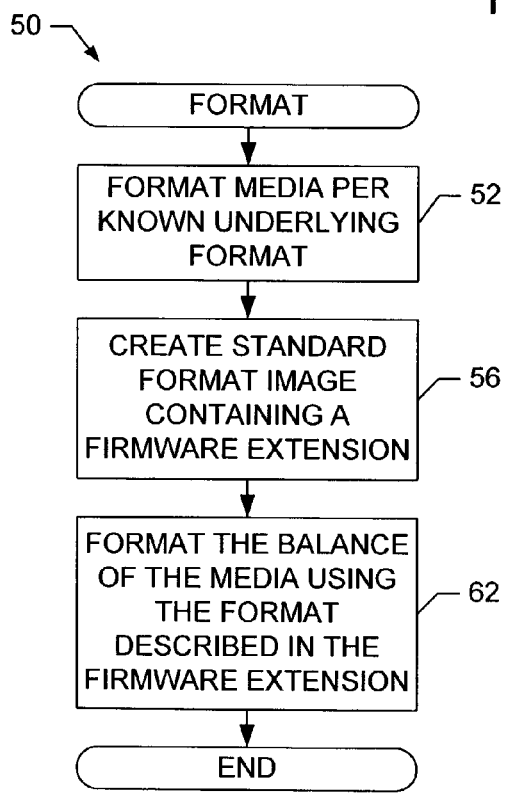
FIG. 2 is a flow diagram of an example format process that may be carried out by the example processor system of FIG. 1.

A format process 50, as shown in FIG. 2, may be carried out by the example processor system 10 of FIG. 1 or may be carried out by another suitable processor system. The format process 50 is carried out when the processor 12 is in a post-boot operating state. For example, the format process may be initiated by a user via an operating system (e.g., Windows®) or may be initiated by a software application.

Figure 3:
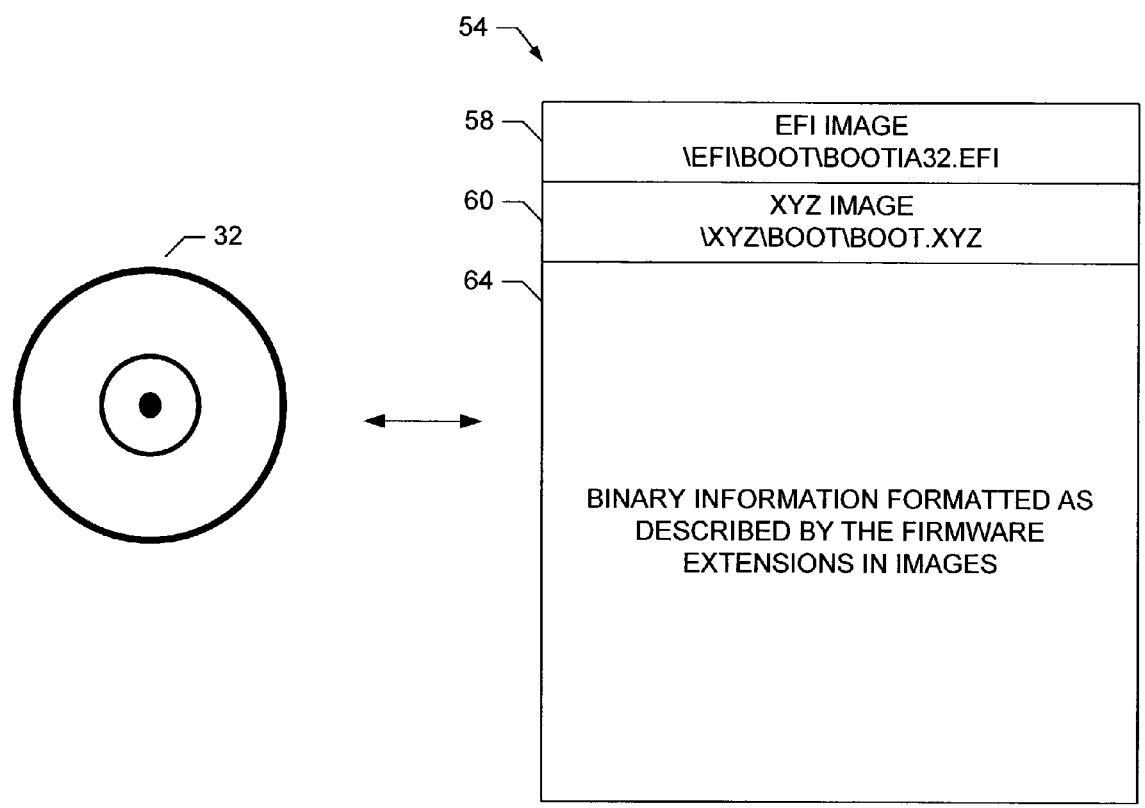
FIG. 3 is a block diagram illustrating an example arrangement of information on the removable storage media of FIG. 1.

After the format process 50 has been initiated, the processor 12 formats the removable storage media 32 with an underlying, known format, such as, for example, ISO 9660 via the removable storage device drive 30 (block 52). Formatting the removable storage media 32 with the underlying format prepares the removable storage media 32 to accept other formats or images that are formatted upon the known format. For example, if the known format is ISO 9660, various images may be formatted onto the ISO 9660 format. Referring to FIG. 3, the entire available area of the removable storage media 32, referred to generally with reference numeral 54, is formatted according to, for example, ISO 9660.

After the removable storage media 32 has been formatted with the underlying format, a standard format image containing a firmware extension is written onto the removable storage media 32 (block 56). For example, as shown in FIG. 3, the image may be an extensible firmware interface (EFI) image 58 having a path on the removable storage media defined as \EFI\BOOT\BOOTIA32.EFI. The EFI image may be referred to as an El Torito standard formatted image, wherein the standard formatted image contains a firmware extension. As described in detail below, this path is the location from which the processor 12 reads when the processor 12 is booting from the removable storage media 32. The BOOTIA32.EFI file likely includes other information than merely a firmware extension. For example, the BOOTIA32.EFI location may include instructions that cause the processor 12 to load an operating system after the firmware extension is loaded and run.

As shown at reference numeral 60 of FIG. 3, numerous images may be formatted onto the underlying format to facilitate the reading of the removable storage media 32 by various types of firmware. For example, an example XYZ image having an associated path (\XYZ\BOOT\BOOT.XYZ) may also be stored on the removable storage media 32. Depending on the firmware (i.e., the boot block firmware) that is booting from the removable storage media 32, the processor 12 may read different images from the removable storage media 32 on boot of the processor 12. However, firmware extensions in the images (e.g., the images 58, 60) describe the format of the digital information on the balance of the removable storage media 32, thereby making the removable storage media 32 self-contained as to its data format.

After the standard format image containing a firmware extension is written onto the removable storage media 32 (block 56), the processor 12 formats the balance of the media using the format described in the firmware extension (block 62). The portion of the removable storage media 32 that is formatted using the format described in the standard images is referred to in FIG. 3 at reference numeral 64.

As noted above, the firmware extensions in the images (e.g., the images 58, 60) specify the format of the remainder of the binary information stored on the removable storage media 32. For example, the firmware extensions may specify sufficient information to enable the processor 12 to read information in a pre-boot environment when the information is formatted in European Computer Manufacturers Association (EMCA)-168, universal disk format (UDF), Macintosh's hierarchical file structure (HFS) or any other existing format or any other format that may be developed in the future. That a particular digital format is not developed as of this writing is not a limitation of the disclosed system. To the contrary, the disclosed system is designed to accommodate future formats and developments in formatting by enabling descriptors of those formats to be written onto the removable storage media 32 as firmware extensions when the removable storage media 32 is formatted. This enables the firmware extension to be read and executed by any subsequent processor so that the processor that executed the firmware extension is able to read the balance of the information on the media, despite the fact that the format of the data on the balance of the media was foreign to the processor before execution of the firmware extension.

Figure 4:
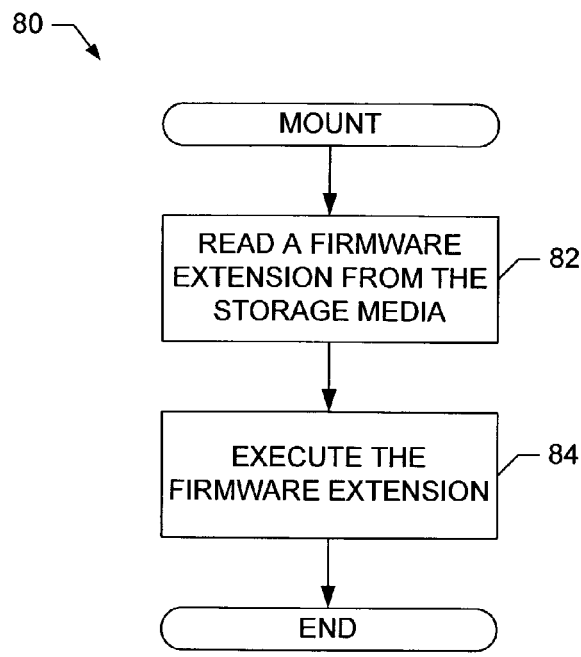
FIG. 4 is a flow diagram of an example mount process that may be carried out by the example processor system of FIG. 1.

When the removable storage media 32 is inserted into the removable storage device drive 30 of FIG. 1 and power is applied to the processor 12, the processor 12 begins its boot sequence. The processor 12 accesses the boot block 20 of the flash 18 and executes instructions that inform the processor 12 how to read information in the underlying format (e.g., ISO 9660) from the removable storage media 32. Upon detection of the presence of the removable media 32 within the removable storage device drive 30, the processor 12 mounts the removable storage media 32, as described in conjunction with a mount process 80 of FIG. 4.

During the mount process 80, the processor 12 reads a firmware extension from the removable storage media 32 (block 82). As described above in conjunction with FIGS. 1-3, the firmware extension is located within an image that is recognizable by the processor 12 after the processor 12 has executed the instructions stored in the boot block 20. For example, if the firmware is EFI-type firmware, the processor 12 will access the EFI Image 58 (FIG. 3) via the removable storage device drive 30 and execute instructions contained in the \BOOT\EFI\BOOTIA32.EFI location. If, however, the firmware is of a different type, the processor 12 will use the removable storage device drive 30 to access an image recognized by that firmware. For example, XYZ-type firmware will access the XYZ image 60 (FIG. 3). Again, the type of firmware that the processor is using to access the images on the removable storage media 32 is not significant. It is only significant inasmuch as the removable storage media 32 must include an image that is readable by the processor 12 after the processor 12 has loaded and executed the instructions in the boot block 20 (FIG. 1).

After the firmware extension on the removable storage media 32 has been read by the processor 12 (block 82), the processor 12 executes the firmware extension (block 84), which causes the processor 12 to publish an application program interface (API) that instructs all hardware and software how to access the removable storage media 32 for reading and writing. Included in this API are instructions that inform the system hardware and software how to interpret the format in which the information on the removable storage media 32 is written. For example, if the binary information, other than the images 58, 60 (FIG. 3), is written in the proprietary Mt. Rainer format, the API published by the firmware extension informs hardware and software of the system 10 how to read and write the Mt. Rainer-formatted data.

The self-contained nature of the removable storage media 32 is exceptionally advantageous because the information interpreting the binary data on the removable storage media 32 need not be shipped with the system 10 as part of the processor firmware in the flash 18. Accordingly, the system manufacturer (e.g., an original equipment manufacturer (OEM) computer company) is not required to purchase licenses for firmware extensions that may or may not be used by the system 10. Rather, each piece of media (e.g., the removable storage media 32) stores the firmware extension that the processor will need to read the data stored on the removable storage media 32. This arrangement is also advantageous because in the constantly evolving computer world, new data formats and storage technologies are constantly emerging. The disclosed arrangement enables a removable storage media to be self contained because it includes the firmware extension needed to be readable by the processor 12.

Figures 5, 6:
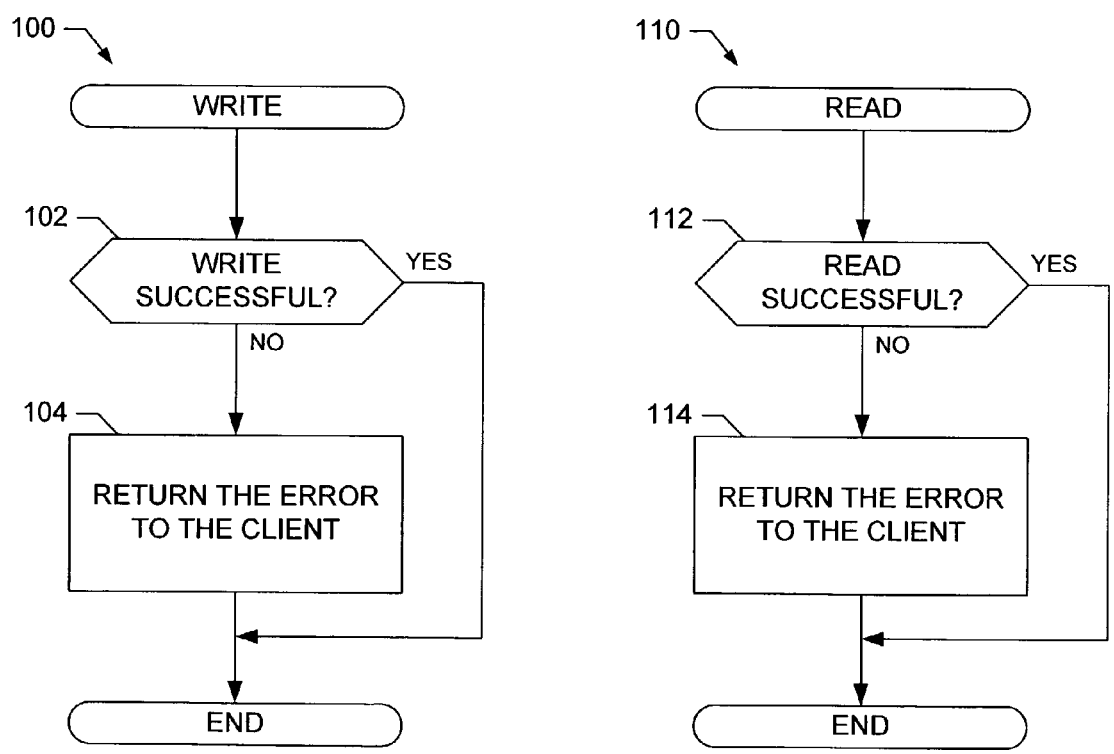
FIG. 5 is a flow diagram of an example write process that may be carried out by the example processor system of FIG. 1.
FIG. 6 is a flow diagram of an example read process that may be carried out by the example processor system of FIG. 1.
Figure 7:
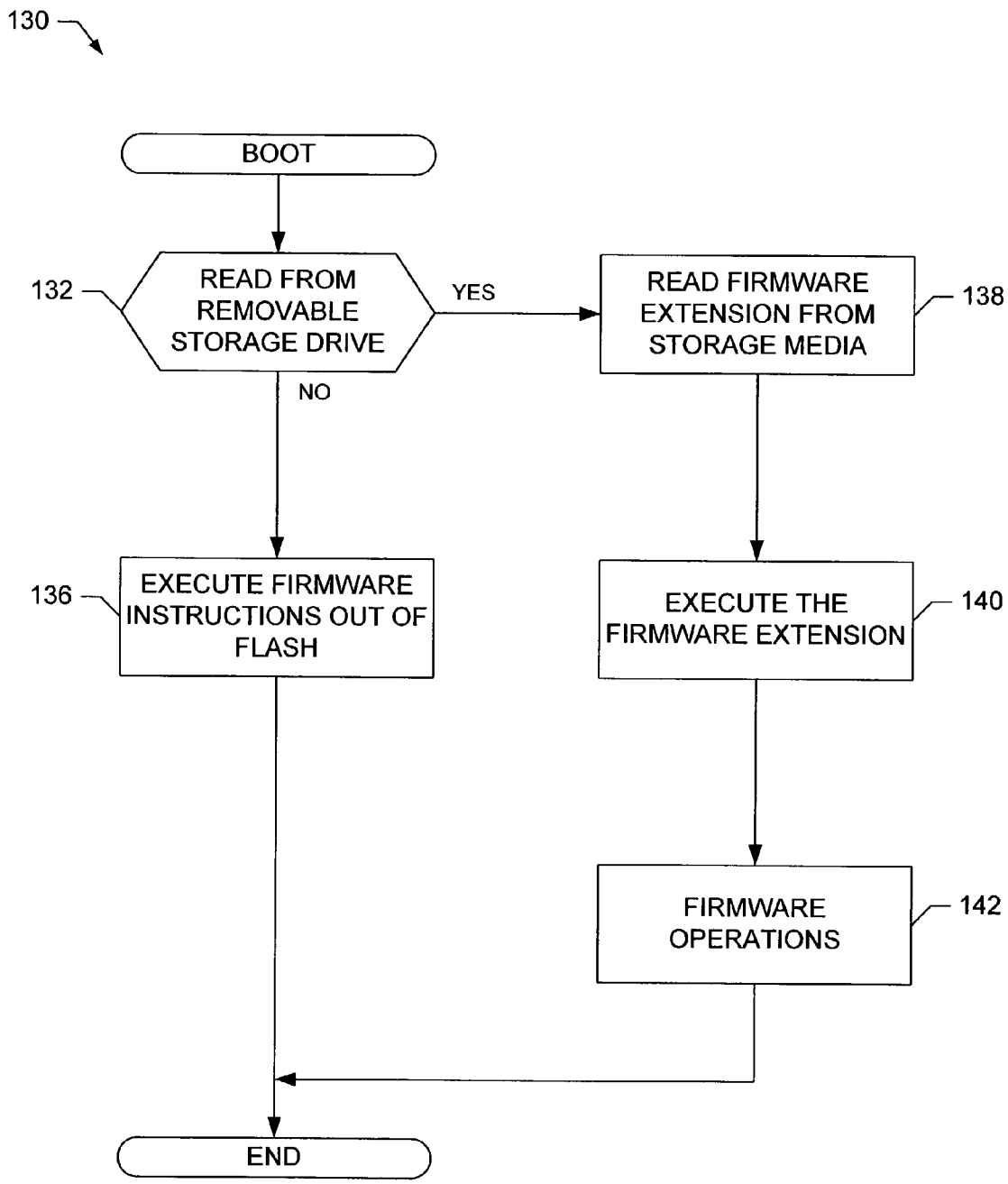
FIG. 7 is a flow diagram of an example boot process that may be carried out by the example processor system of FIG. 1.

After the removable storage media 32 has been mounted as described in conjunction with the mount process 80, certain hardware or software components, either in pre-boot or post-boot, may write information to or read information from the removable storage media 32. FIGS. 5 and 6 provide examples of write and read processes from the perspective of the API installed by the firmware extension.

A write process 100 is initialized when hardware and/or software in the system 10 has information to be written to the removable storage media 32. When hardware or software has information to be written to the removable storage media 32, that hardware or software calls the API published by the firmware extension, which causes the execution of the write process 100. After the write process 100 is initiated and attempts to write data passed from hardware or software onto the removable storage media 32, the write process 100 determines if the write was successful (block 102). If the write was successful, the write process 100 ends because the API published by the firmware extension was successful.

Alternatively, if the write is not successful (block 102), the error is reported to the client (i.e., the hardware or software that called the API to initiate the write process (100)) (block 104). The error reported to the client may include a description of the error that the API received when the write to the removable storage media 32 was attempted. Based on the error, the hardware, software and/or firmware that initiated the write process 100 may respond in a number of different ways. For example, if the error is due to a media change, the client may remount the removable storage media 32 using the mount process 80 (FIG. 4), and may then attempt to write to the newly mounted media using the write process 100. Alternatively, upon receiving the error provided by the write process 100, the client may simply report its failure to write to a user and may then abort the write process.

When a portion of hardware, software and/or firmware needs to read information from the removable storage media 32, access is made to the API installed by the firmware extension, which initiates a read process 110 of FIG. 5. After the read process 110 is initiated, the process 110 determines if the read was successful (block 112). Whether a read was successful may be determined by the read process 110 receiving an error (block 112). For example, if the API that was installed by the firmware extension is unable to read from the removable storage media 32, an error will be returned to the read process 110. The read process 110, in turn, passes the error to the client that called the read process 110 (block 114). Upon receipt of the error from the read process 110, the client that called the read process 110 may reinitiate the read or may choose to abort the read process. As a further alternative, the client, upon receipt of the error from the read process 110, may choose to remount the removable storage media 32 using the mount process 80 of FIG. 4.

In addition to the write and read processes 100, 110, the system 10 can also boot from the removable storage media 32 that is placed in the removable storage device drive 30, according to a boot process 130. The boot process 130 may be initiated by, for example, applying power to the system 10 when the removable storage media 32 is placed within the removable storage device drive 30. As is known to those having ordinary skill in the art, upon receiving power, the processor 12 experiences a reset condition that causes the processor 12 to execute instructions located in the boot block 20 of the flash memory 18 via a reset vector in the processor 12. As noted above, the instructions in the boot block 20 provide the processor 12 the ability to attempt to boot not only from the mass storage device 28, the RAM 14 or the ROM 16, but also enable the processor 12 to boot from the removable storage media 32.

Within the boot process 130, the processor 12 determines if it should boot from the removable storage media 32 or from some other instruction source (block 132). If the boot process 130 is not to take place from the removable storage media 32, the processor 12 begins executing firmware instructions out of the flash 18 (block 136) as part of the boot process 130.

Alternatively, if the processor 12 determines that it is to boot from the removable storage media 32 (block 132), the processor 12 reads the firmware extension from the removable storage media 32 (block 138). As previously described in conjunction with FIG. 3, when the processor 12 attempts to boot from the removable storage media 32, the processor 12 accesses an image (e.g., either of the images 58 or 60 of FIG. 3) appropriate for the processor firmware in the boot block 20. For example, EFI-type firmware will access an EFI image (e.g., the EFI image 58) on the removable storage media 32. Within the accessed image on the removable storage media 32 is a firmware extension defining the format in which the remaining information on the removable storage media 32 is written. After being read, the firmware extension is executed by the processor 12, which, as described in conjunction with the mount process 80 of FIG. 4, causes the processor 12 to publish an API describing the format for the information on the remainder of the removable storage media 32 (block 140).

After the firmware extension is executed (block 140), other firmware operations may be carried out (block 142). For example, the other firmware operations may include, but are not limited to, reading information from the removable storage media 32 and writing such information to the flash 18. In such an arrangement, the information read from the removable storage media 32 may be firmware instructions. For example, the processor 12 may read firmware restoration or update information from the removable storage media 32 and may use the read information to provide firmware functionality to the processor 12, above and beyond the functionality provided to the processor 12 as a result of the instructions in the boot block 20. The boot process 130, when carried out as reading from the removable storage media 32, may be conceptualized as a mount process (e.g., the mount process 80 of FIG. 4) followed by a read process (e.g., the read process 110 of FIG. 6).

Although the foregoing description illustrates an example in which a firmware extension is used to inform a processor as to the format of the data on a removable storage media, such a configuration could be used for encryption applications. For example, the firmware extension could be a key used for decryption of data on the remainder of the removable storage media. This encryption/decryption technique could be used to prevent copying or execution of the contents of the removable storage media. This arrangement requires the removable storage media to be inserted in the removable storage media device drive for execution of the software.

Although certain apparatus constructed in accordance with the teachings of the invention have been described herein, the scope of coverage of this patent is not limited thereto. On the contrary, this patent covers all embodiments of the teachings of the invention fairly falling within the scope of the appended claims either literally or under the doctrine of equivalents.

What is claimed is:

1. A machine readable medium programmed to be read by a machine, the machine readable medium comprising:
    a first portion storing information arranged according to a format;
    a second portion storing a first firmware extension thereon, wherein the first firmware extension is programmed to be read by a machine in a pre-boot environment and to inform the machine how to read the format of information stored in the first portion without the machine having prior knowledge of how to read the format, wherein the second portion is read to boot a first firmware; and
    a third portion storing a second firmware extension thereon, wherein the second firmware extension is programmed to be read by the machine in a pre-boot environment and to inform the machine how to read the format of information stored in the first portion without prior knowledge of how to read the format, wherein the third portion is read to boot a second firmware.

2. A machine readable medium as defined by claim 1, wherein the first firmware extension causes the machine to publish an application program interface when executed by the machine.

3. A machine readable medium as defined by claim 1, wherein the first firmware extension is stored on the machine readable medium in a location accessed by the machine during a boot sequence of the machine.

4. A machine readable medium as defined by claim 3, wherein further instructions stored in the location in which the first firmware extension is stored on the machine readable medium cause the machine to boot an operating system after the first firmware extension is read by the machine.

5. A machine readable medium as defined by claim 3, wherein the location in which the first firmware extension is stored on the machine readable medium is based on first firmware executed by the machine.

6. A machine readable medium as defined by claim 5, wherein if the first firmware executed by the machine comprises extensible firmware interface (EFI) firmware, the location in which the first firmware extension is stored on the machine readable medium comprises a path of \EFI\BOOT\BOOTIA32.EFI.

7. A machine readable medium as defined by claim 1, wherein the machine readable medium comprises an optical media.

8. A machine readable medium as defined by claim 7, wherein the optical medium comprises at least one of a compact disk (CD), and a digital versatile disk (DVD).

9. A machine readable medium as defined by claim 1, wherein the information in the first portion is encoded with a key that is located in the first firmware extension.

10. A method of formatting a machine readable medium programmed to be read by a machine, the method comprising:
    formatting a first portion of the machine readable medium according to a first format;
    formatting a second portion of the machine readable medium according to a second format; and
    storing a first firmware extension in the second portion of the machine readable medium, wherein the first firmware extension is programmed to be read by a machine in a pre-boot environment to inform the machine how to interpret the first format without the machine having prior knowledge of how to read the first format, wherein the second portion is read to boot a first firmware;
    formatting a third portion of the machine readable medium according to a third format; and
    storing a second firmware extension in the third portion of the machine readable medium, wherein the second firmware extension is programmed to be read by the machine in a pre-boot environment to inform the machine how to interpret the first format without the machine having prior knowledge of how to read the first format, wherein the third portion is read to boot a second firmware.

11. A method as defined by claim 10, wherein the first firmware extension causes the machine to publish an application program interface when executed by the machine.

12. A method as defined by claim 11, wherein storing the first firmware extension in the second portion of the machine readable medium includes storing the first firmware extension in a location accessed by the machine during a boot sequence of the machine.

13. A method as defined by claim 10, wherein the first format is unreadable by the machine in the pre-boot environment before the first firmware extension is read.

14. A method as defined by claim 10, wherein the second format is readable by the machine in the pre-boot environment before the first firmware extension is read.

15. A method as defined by claim 10, further including storing instructions in the location in which the firmware extension is stored on the machine readable medium to cause the machine to boot an operating system after the first firmware extension is read by the machine.

16. A method as defined by claim 10, wherein storing the first firmware extension includes storing the first firmware extension on the machine readable medium in a location based on first firmware executed by the machine.

17. A method as defined by claim 10, wherein if the first firmware executed by the machine comprises extensible firmware interface (EFI) firmware, the location in which the first firmware extension is stored on the machine readable medium comprises a path of \EFI\BOOT\BOOTIA32.EFI.

18. A method as defined by claim 10, wherein formatting the first and second portions of the machine readable medium comprises formatting an optical medium.

19. A method as defined by claim 10, wherein the machine readable medium comprises a magnetic medium.

20. A system to format a machine readable medium programmed to be read by a first machine, the system comprising:
  a device drive adapted to receive the machine readable medium;
  a second machine coupled to the device drive, wherein the second machine is programmed to cooperate with the device drive to:
    format a first portion of the machine readable medium according to a first format;
    format a second portion of the machine readable medium according to a second format;
    format a third portion of the machine readable medium according to a third format;
    store a first firmware extension in the second portion of the machine readable medium, wherein the first firmware extension is programmed to be read by the first machine in a pre-boot environment to inform the first machine how to interpret the first format without the machine having prior knowledge of how to read the first format, wherein the second portion is read to boot a first firmware; and
    store a second firmware extension in the third portion of the machine readable medium, wherein the second firmware extension is programmed to be read by the first machine in a pre-boot environment to inform the first machine how to interpret the first format without the machine having prior knowledge of how to read the format, wherein the third portion is read to boot a second firmware.

21. A system as defined by claim 20, wherein the second machine is programmed to cooperate with the device drive to store the first firmware extension in a location accessed by the first machine during a boot sequence of the first machine.

22. A system as defined by claim 21, wherein the second machine is programmed to cooperate with the device drive to store instructions stored in the location in which the first firmware extension is stored on the machine readable medium, wherein the stored instructions cause the first machine to boot an operating system after the first firmware extension is read by the first machine.

23. A system as defined by claim 20, wherein the first format is unreadable by the first machine in the pre-boot environment before the first firmware extension is read.

24. A system as defined by claim 20, wherein the second format is readable by the first machine in the pre-boot environment before the first firmware extension is read.

25. A system as defined by claim 20, wherein the second machine is programmed to cooperate with the device drive to store the first firmware extension on the machine readable medium in a location based on first firmware executed by the first machine.

26. A method of reading information from a medium with a machine operating in a pre-boot environment, wherein the medium includes a first portion storing information arranged according to a format, a second portion storing a first firmware extension thereon, and a third portion storing a second firmware extension thereon, the method comprising:
  reading the first firmware extension from the second portion of the medium;
  reading the second firmware extension from the third portion of the medium;
  executing one of the first firmware extension or the second firmware extension to inform the machine how to read the information in the first portion arranged according to the format without the machine having prior knowledge of how to read the format;
  reading information in the first portion of the medium.

27. A method as defined by claim 26, wherein reading the first firmware extension from the second portion of the medium includes reading the first firmware extension from at least one of an optical medium and a magnetic medium.

28. A method as defined by claim 26, wherein executing the first firmware extension comprises publishing an application program interface.

29. A method as defined by claim 28, wherein reading information from the first portion of the medium includes using the application program interface.

30. A machine readable medium as defined by claim 1, wherein the format is a digital format.

31. A method as defined by claim 10, wherein the first and second formats are digital formats.

32. A system as defined by claim 20, wherein the first and second formats are digital formats.

33. A method as defined by claim 26, wherein the format is a digital format.

34. A machine readable medium as defined by claim 2, wherein the application program interface includes instructions that inform at least one of software or hardware components how to interpret the format in which the information in the first portion is written.

35. A machine readable medium programmed to be read by a machine, the machine readable medium comprising:
  a first portion storing information arranged according to a format; and
  a second portion storing a firmware extension thereon, wherein the firmware extension is programmed to be read by a machine in a pre-boot environment and to inform the machine how to read the format of information stored in the first portion without the machine having prior knowledge of how to read the format,
  wherein the firmware extension causes the machine to publish an application program interface when executed by the machine, and
  wherein the application program interface is programmed to initiate a read process in the pre-boot environment to read from the machine readable medium at least one of firmware restoration information or firmware update information and to provide to the machine additional functionality than the machine would have if booted from a flash.

36. A machine readable medium as defined by claim 2, wherein the application program interface is programmed to initiate a write process in the pre-boot environment to write data to the machine readable medium.

* * * * *